July 5, 1949.　　　　　F. NEUMANN　　　　　2,475,570
GUN SIGHT

Filed Aug. 4, 1947　　　　　　　　　　　　2 Sheets-Sheet 1

*INVENTOR.*
FERDINAND NEUMAN

BY

ATTORNEY

Patented July 5, 1949

2,475,570

UNITED STATES PATENT OFFICE 2,475,570

GUN SIGHT

Ferdinand Neumann, Detroit, Mich.

Application August 4, 1947, Serial No. 766,006

5 Claims. (Cl. 33—52)

This invention relates to gun sights and more particularly to a rear gun sight providing a wide field of unobstructed vision and being adapted for rapid vertical adjustment.

Although commercial, as distinguished from military, gun sights capable of variation to accommodate different ranges have been known for many years, these developments have produced a sight having certain unsatisfactory operational characteristics. One operational deficiency of commercial sights under field conditions has been due in part to the restricted scope of the field in the target area which the operator can see when using a rear sight comprising a marked surface on an upturned plate. Such sights have an obstruction to the operator's vision below the line of sight preventing a full view of the target area. Such sights are particularly difficult to use under poor lighting conditions such as exist at dawn.

Another feature has been the failure of the commercial sights to provide sufficient vertical adjustment to accommodate more than a very limited number of the various types of front sights available for use therewith. Especially is this true where it is desirable to maintain a clear field of vision around the target area. Those which do give the desired vision are limited in their adjustment or vice versa.

My invention corrects these operational deficiencies by providing, in the specific embodiment herein illustrated and described, a rear gun sight having an unobstructed field of vision above and partly below the sighting bar and does so without sacrificing rapid vertical adjustment of the entire sight.

Accordingly, the major object of my invention is to provide a rear sight having an unobstructed field of vision of the target area above the line of sight.

A further object of the invention is to provide a rear sight having a substantially unobstructed view of the target area below the line of sight.

A further object of my invention is to provide a sight capable of a substantial positive vertical adjustment to accommodate a wide variety of front sights.

An additional object of my invention is to provide a sight having a means of vertical adjustment which is both swift and positive.

Another object of my invention is to provide a rear sight in which the vertical adjustment may be easily made with one hand.

An additional object of my invention is to provide a sight adapted to use a positive stop for a range change from one selected range to another selected range, such as from 100 to 200 yards or more.

A further object of my invention is to provide a sight suitable for use under poor lighting conditions.

A still further object of my invention is to provide a rear sight suitable for mounting on a wide variety of guns.

Another object of my invention is to provide a sight having the foregoing capacities and yet be capable of easy and cheap fabrication.

Other objects and purposes of my invention will be apparent to those acquainted with equipment of this sort and the disadvantages which it is intended to remedy, upon reference to the accompanying drawings and the following specification.

Description

Figure 1:
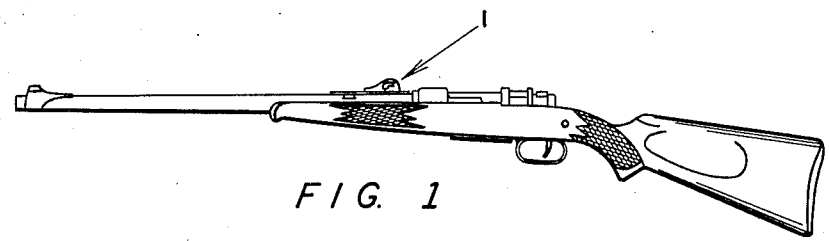
Figure 1 is a side elevational view of a gun with my rear sight mounted thereon in operating position.
Figure 2:
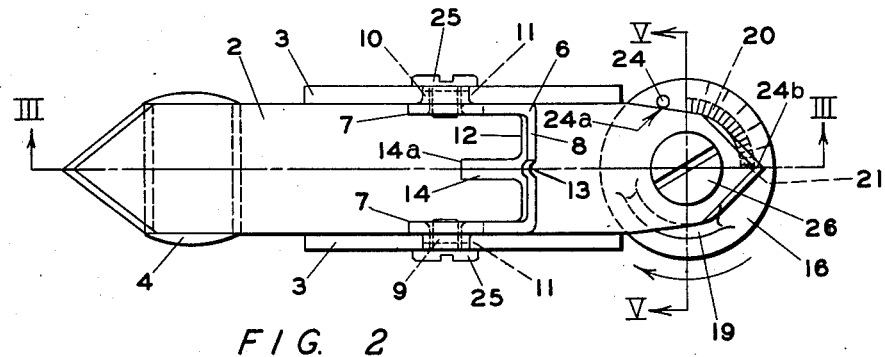
Figure 2 is a top view of my sight.
Figure 3:
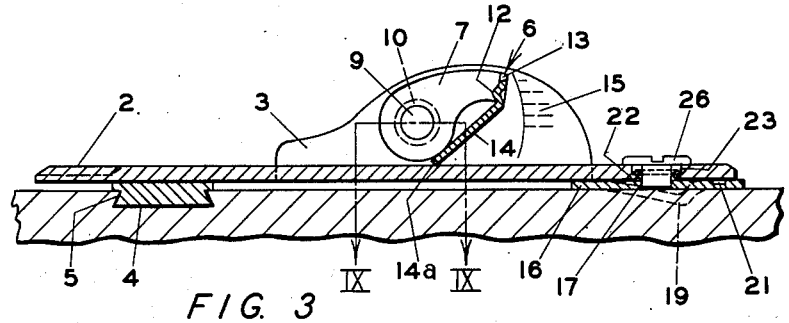
Figure 3 is a sectional view in side elevation of my invention the section being taken on line III—III of Figure 2.
Figure 4:
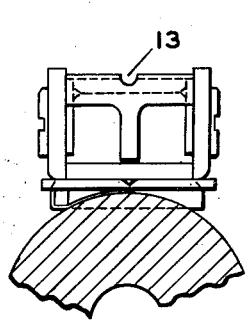
Figure 4 is a rear elevational view of my invention.
Figure 5:
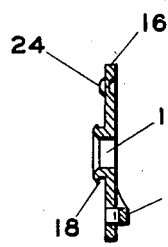
Figure 5 is a sectional view showing only the cam of my invention taken along the plane of V—V of Figure 2.

In providing means meeting the objects and purposes outlined above, I have provided a rear sight having a central, vertically narrow, sighting bar capable of vertical adjustment, to compensate for the height of the front sight, in combination with a cam providing swift, final height adjustment of the rear sight to compensate for the range of the target.

The terms "forward," "rearward," "upward" and "downward" are hereafter used and are to be taken in relation to the sight when mounted on a gun held in normal firing position, with "forward" indicating the direction toward the muzzle.

Referring now to the drawings in more detail, the numeral 1 indicates a rear sight having a base member 2 and vertical side walls 3.

A trapezoidal mounting block 4 is rigidly attached to the lower surface of the base member 2 near the forward end by any convenient means such as welding. A key way 5, or dove tail slot, may be provided in the barrel of the gun to seat the mounting block.

The side walls 3 may be rectangular, triangular or have an irregularly curved outline as shown. They may be formed integral with the base member 2 or formed from separate parts and attached to the base by any suitable means such as welding.

The pivotable sight member 6 is a U-shaped member comprising two support legs 7 joined by the sighting bar 8. At the forward end of each support leg there is an opening 9 surrounded by an outwardly projecting annular boss 10 the inner surface of which is threaded. A pair of mounting holes 11 is provided one through each of the side walls 3, coordinated with each other and each of sufficient diameter to receive one of the annular bosses 10.

The sighting bar 8 has a forwardly projecting bead 12 parallel to the upper surface of the bar which serves as a strengthening means. The sighting notch 13 is located in the upper surface of the sighting bar equidistant between the side walls 3. Directly beneath the sighting notch 13 a narrow depending member 14 projects downwardly and at such an angle forwardly that when the sight is rotated on the bosses 10 the lower end 14a of the depending member remains close to, or touching, the base member 2.

The graduations 15 indicate elevation at which the rotatable sighting member 6 should be set for different rifles with standard front sights at a selected range. These graduations 15 are engraved or stamped on the inner surface of the side walls 3.

The elevation disk 16 has a polygonal or a serrated periphery and a centrally located hole 17 surrounded by an annular boss 18 the inner surface of which is threaded. On the lower surface of the disk 16 there is a downwardly projecting bead 19 whose lower surface defines an inclined plane (Figures 2, 3, 4 and 5). On the upper surface a semicircular row of serrations 20 constituting a series of closely spaced depressions are provided. A tooth 21 projects downwardly from the base member 2 in coordination with the serrations 20.

The hole 22 extends through the base member 2 at the rearward end thereof which hole is countersunk 23 at its upper side. The purpose of this countersink will appear more fully hereinafter. The elevation disk 16 may be provided with an embossment 24 facing upward providing limits for the turning movement of disk 16 by striking base member 2 at points 24a and 24b.

The various parts constituting the rear sight may be fabricated from any suitable material provided, however, that the surface thereof is dull, or may be made dull, and nonreflecting to prevent interference with the use of the sight. The material most commonly used for sights of this type is steel although my invention is not so limited.

Assembly

The mounting block 4 is rigidly attached to the base member 2 by any suitable means such as welding. When the side walls 3 are made integral with the base 2, the pivotable sighting member 6 is installed by springing the support legs 7 together sufficiently to permit the bosses 10 to be inserted in the openings 9. The screws 25 are then installed and tightened sufficiently to prevent further movement of the pivotable member 6, said member having previously been adjusted to the desired elevation as hereinafter explained.

The boss 18 of the elevation disk 16 is inserted upwardly into the opening 22. When it is fully inserted the upper part of the boss is flared radially outward into the countersink 23 thereby locking the base member 2 and elevation disk 16 against subsequent separation. The flaring operation must be so performed that the disk 16 may thereafter freely rotate in a horizontal plane.

Operation

The pivotable sighting member 6 is first adjusted by pivoting on the bosses 10 to assume the correct position required by the type of front sight being used and the type of gun upon which it is mounted. It is then locked into place by tightening the screws 25. Thereafter elevational adjustments are made for ranges beyond a preselected distance, usually 100 yards, by rotating the disk 16. This causes the bead 19 to contact the gun barrel and separate the base 2 therefrom a distance controlled by such rotation.

As the rotation is continued the inclined lower surface of the bead 19 acts as a cam forcing the rear of the entire sight upwardly from the barrel by which the sighting point or the notch 13 is controllably raised.

When the disk 16 has been rotated sufficiently to raise the sight to the desired position, the disc 16 is held against further rotation in either direction by the tooth 21 which seats in one of the serrated depressions 20. The resiliency residing in both the base 2 and the disk 16 permits the two parts to spring apart sufficiently to allow the ridge between the depressions 20 to pass under the tooth 21 when the disk 16 is being rotated.

When the embossment 24 is used, it acts as a stop determining the degree of rotation of the disk. It is so located that it will contact the base 2 when the disk has been turned to a point which will cause the sight to be raised to a predetermined level.

If it is desired to set the disk 16 in one certain position and lock it against subsequent accidental movement, the set screw 26 may be used.

The depending member 14 serves to block out any view of the central member of the front sight when it is below the notch 13. This eliminates the optical confusion caused by the front sight appearing below the rear sighting bar without materially impairing the desired full view of the target.

If the front sight appears under the sight bar 8 on either side of member 14 it indicates that the stock of the rifle does not fit the individual when the rifle is brought in position properly.

Variations

The sighting member may be made integral with the base 2 and the set screws 25 and the corresponding openings 9 and 11 and the annular bosses 10 eliminated. When so made the sighting member 6a may be cut in the form of a T (Figures 6, 7 and 8) and bent upwardly from the base 2, the upper end being given a further bend 31 to align it in proper vertical position by means of dimples, pins or other means 28 in the side walls 3. The support 30 connects sight bar 32 with the base 2. Such an arrangement provides a rear sight suitable for use with only a single type of front sight, however, the quick final adjustment remains unaffected.

Where the sight is to be used on a gun having an octagonal, or other non-circular, barrel, the cam arrangement may be readily modified to fit without material change in any of the parts above described merely by altering the length of the cam surfaces.

Figure 6:
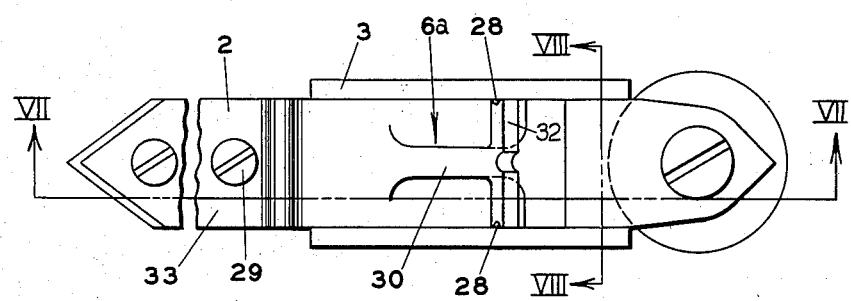
Figure 6 is a top view of a modification of my invention.
Figure 7:
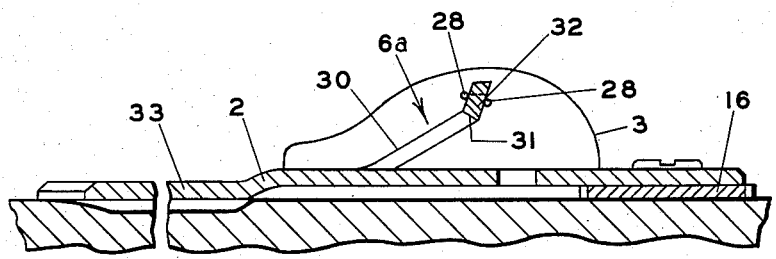
Figure 7 is a central sectional view of my invention taken along the plane VII—VII of Figure 6.
Figure 9:
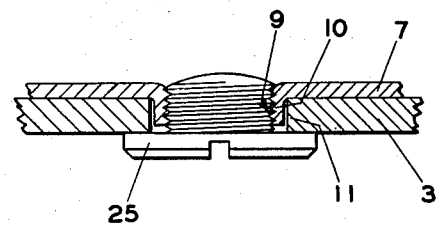
Figure 9 is an enlarged sectional fragmentary detail of which the section is taken on line IX—IX of Figure 3.
Figure 8:
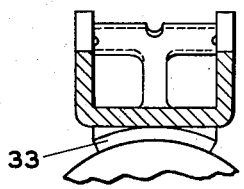
Figure 8 is a sectional, rear elevational view of the modification of my invention shown in Figure 6 taken along the plane VIII—VIII of Figure 6.

To permit adaption of the sight to use with guns not equipped with the keyway 5, the mounting arrangement may be modified as shown in Figures 6, 7 and 8. Such adaption is accomplished by offsetting the forward end of the sight downwardly a distance equal to the clearance between the base 2 of the sight and the barrel of the gun. The resulting offset portion 33 is then formed into an arc to provide proper bearing on the gun barrel. The sight is then installed on the barrel by means of the screw 29. The gun is tapped to receive the mounting screws 29.

Various other modifications in the specific examples herein described will suggest themselves to those skilled in the art, but it is to be understood that the invention hereby disclosed is to be limited only by the spirit and scope of the appended claims.

I claim:

1. A rear sight for a gun comprising: a body member having a base portion and upwardly projecting wall portions each containing an opening; a vertically adjustable sighting member having two supporting legs connected by a sighting bar; an annular boss at the free end of each of said supporting legs adapted for seating within said respective openings in said wall portions and means holding said legs in position; a notch in said sighting bar; a depending member projecting from said sighting bar downwardly and toward said annular bosses; a cam for elevating said sight; means for locking said cam in position; means for mounting said sight on said gun, whereby a clear field of vision is provided through the sight to the target area.

2. In a rear sight for a gun, the combination comprising: a base member and means for fastening same to a gun barrel; a pair of side members each extending vertically upward from said base member and located at opposite, lateral extremities thereof; a horizontal sighting bar extending between said side members and means holding same in a selected position therebetween spaced from said base member, and a depending member of relatively narrow lateral dimension extending downwardly and forwardly from the central part of said sighting bar, said lateral dimension being sufficient only to block view of the front sight of the gun when in line therewith but insufficient to constitute any substantial obstruction to view of the target area.

3. A rear sight for a gun comprising: a body member having a base portion and upwardly projecting wall portions, each containing an opening which openings are opposed to each other; a vertically adjustable sighting member having two parallel supporting legs, an annular boss at the end of each of said supporting legs which is muzzleward of the gun when mounted in operating position and adapted for seating within said respective openings in said wall portions and means holding said legs in position within said openings, the other ends of each of said supporting legs being connected by a transverse, vertically narrow, sighting bar normally spaced substantially more than its own vertical dimension upwardly from the upper surface of said base portion; a notch in the upper side of said sighting bar; a depending member projecting from said sighting bar at a point directly below said notch downwardly and toward said annular bosses; means for mounting said sight on said gun; all said parts being so constructed and arranged that a clear view is provided through the sight to the target area and yet vision of the front sight of the gun is blocked by said depending member except when sighting through said notch or above said sighting bar.

4. In a rear sight for a gun the combination comprising: a base; a vertically narrow, horizontal bar normally spaced upwardly from the upper surface of said base and having a narrow depending member extending downwardly and forwardly from the middle thereof to a point closely adjacent to the upper surface of said base; means including said base adjustably mounting said bar in selected position above the gun barrel; a sighting notch in the upper edge of said horizontal bar directly above said depending member; the whole being so constructed and arranged that when the user's line of sight passes below said horizontal bar and along the center of the gun barrel, vision of the front sight will be blocked by said depending member but there will at all times nevertheless be maintained a substantially clear view of the target area.

5. A rear sight for a gun, comprising: a body member having a base portion and upwardly projecting side portions, each containing an opening opposed to the corresponding opening in the other side portion; a pair of parallel leg members lying adjacent to and parallel with said side portions and having an outwardly extending annular boss on the forward end of each thereof seated within said respective openings in said side portions; means holding said bosses pivotally within said openings and adjustable for holding said legs movable or fixed with respect to said side portions; a vertically narrow, horizontally arranged sighting bar spaced upwardly from the upper surface of said base portion, connecting the rearward ends of said leg members and having a sighting notch in the upper side and center of said bar; a laterally narrow member depending downwardly and forwardly of said sighting bar from a point directly below said notch to a point closely adjacent the upper surface of said base portion; means for mounting said base portion on said gun; whereby a clear field of vision is at all times provided through the sight to the target area and yet in normal usage vision of the front sight is blocked by said depending member excepting as the line of sight is through said notch or across the top of said horizontal bar.

FERDINAND NEUMANN.

REFERENCES CITED

The following references are of record in the file of this patent:

UNITED STATES PATENTS

| Number | Name | Date |
| --- | --- | --- |
| 1,160,374 | Buchanan | Nov. 16, 1915 |
| 1,338,382 | Lewis | Apr. 27, 1920 |
| 2,407,437 | Mossberg | Sept. 10, 1946 |

FOREIGN PATENTS

| Number | Country | Date |
| --- | --- | --- |
| 124,670 | Germany | 1900 |